United States Patent [19]
Untz

[11] 4,452,338
[45] Jun. 5, 1984

[54] TREE CLIMBING APPARATUS
[76] Inventor: Reese E. Untz, Rte. 7, Box 6655, Charlotte, N.C. 28213
[21] Appl. No.: 481,467
[22] Filed: Apr. 1, 1983
[51] Int. Cl.³ .................. A01M 31/02; A45F 3/26; A47C 9/10
[52] U.S. Cl. .................................... 182/187; 182/136
[58] Field of Search ............... 182/187, 188, 133–136
[56] References Cited

U.S. PATENT DOCUMENTS

| | | | |
|---|---|---|---|
| 3,419,108 | 12/1968 | Mobbs | 182/187 |
| 3,955,645 | 5/1976 | Dye | 182/187 |
| 3,960,240 | 6/1976 | Cotton | 182/187 |
| 4,022,292 | 5/1977 | Van Gompel | 182/187 |
| 4,120,379 | 10/1978 | Carter | 182/187 |
| 4,134,474 | 1/1979 | Stavenau | 182/187 |
| 4,230,203 | 10/1980 | Sweat | 182/187 |
| 4,236,602 | 12/1980 | Leggett | 182/187 |
| 4,316,526 | 2/1982 | Amacker | 182/187 |
| 4,321,982 | 3/1982 | Strickland | 182/187 |
| 4,331,216 | 5/1982 | Amacker | 182/187 |
| 4,369,858 | 1/1983 | Babb | 182/187 |

Primary Examiner—R. P. Machado
Attorney, Agent, or Firm—Richards, Shefte & Pinckney

[57] ABSTRACT

A portable tree climbing device for use by a hunter or observer waiting on game and using as the case may be, a bow and arrow, gun or camera. It comprises two assemblies, a main body supporting assembly and a foot supporting assembly, each assembly having a two piece tubular frame with respective telescoping arms that cooperatively encircle the tree or pole. The main body supporting assembly has a seat and a pivotably movable seat back member adapted to be moved between a position perpendicularly adjacent the seat outwardly from the tree wherein a user may be seated on the seat facing toward the tree and a position abutting the tree spaced forwardly from and horizontally above and parallel to the seat for user seating on the seat back member facing away from the tree.

9 Claims, 4 Drawing Figures

TREE CLIMBING APPARATUS

BACKGROUND OF THE INVENTION

The present invention relates to tree climbing apparatus for use by hunters and observers of wildlife.

Hunters and avid wildlife observers have long found it advantageous to take a resting position at an elevated location, such as in a tree, from which candid, undetected observation of wildife or other items of interest may be more readily and easily accomplished. For this purpose, a wide variety of apparatus have been developed and proposed for enabling a person to ascend and descend a tree or other columnar member quickly and safely. Various examples of such apparatus are disclosed in U.S. Pat. Nos. 3,955,645; 3,960,240; 4,230,203; 4,316,526; 4,321,983; and 4,331,216.

Typically, such devices basically provide a seat frame assembly for supporting the user's main body and a foot frame assembly for supporting the user's feet and legs, each assembly being constructed for encircling disposition about a tree or column and for selectively engaging the tree upon application of weight to the assembly to remain in place on the tree and tilted disengaging from the tree when no appreciable weight is applied to the assembly to permit sliding movement along the tree. The user is enabled to ascend and descend a tree by alternately standing on the foot frame assembly to engage it with the tree while slidably raising or lowering the seat frame assembly along the tree as desired and then sitting on the seat frame assembly to engage it with the tree while slidably raising or lowering the foot frame assembly as desired by manipulation thereof with the user's feet and legs. In ascending a tree, once the desired elevation is reached, the user simply employs the seat frame assembly as a seat from which to hunt or observe his item of interest.

In the most popular forms of such devices, the seat frame assembly is constructed to dispose the seat surface at an outward spacing from the tree for seating of the user facing the tree, this seat disposition facilitating the ascending and descending operation of the devices and providing a more stable and secure feeling to most users while stationarily seated at an ascended resting elevation. Examples of this type of device are disclosed in the above-noted U.S. Pat. Nos. 4,230,203; 4,316,526 and 4,321,983. However, when seated facing the tree, the tree at least partially obstructs the user's view and, furthermore, the normal construction of this form of device restricts the user's range of turning movement. Accordingly, certain users find it to be more desirable to be seated facing away from the tree once ascended to a desired elevation but most forms of climbing devices do not facilitate such seating disposition. Certain modified forms of climbing devices have therefore been proposed having seat frame assemblies adapted for user seating with his back against the tree for facing away therefrom. Examples of these devices are disclosed in the above-noted U.S. Pat. Nos. 3,960,240 and 4,230,203. These devices, however, also require the user to perform the ascending and descending operation while facing away from the tree which not only requires more difficult physical movements by the user but also is generally unsafe. One device has been proposed having a seat frame assembly with a sliding seat member to permit selective positioning of the seat member spaced from or adjacent to the tree for user seating facing either toward or away from the tree, this device being the subject of above-noted U.S. Pat. No. 4,331,216.

The present invention provides an improved tree climbing device having a seat frame assembly wherein a movable seat back arrangement is provided for positioning in two different positions enabling the device to be safely and easily operated in conventional manner for ascending and descending a tree and to be selectively employed in an ascended, resting position for user seating facing either toward or away from the tree as desired.

SUMMARY OF THE INVENTION

The tree climbing apparatus of the present invention includes a seat frame arrangement for disposition about a tree for selective engagement therewith for supporting a user's main body and selective disengagement therefrom for sliding along the tree. Basically, the seat frame arrangement includes a main seat frame member for engaging the tree at one side thereof, a seat bracing frame member for engaging the tree at the opposite side thereof, and means for selectively affixing the main seat frame member and seat bracing frame member in disposition about the tree. According to the present invention, the seat frame member includes a platform brace arrangement having a supporting seat surface and adapted to engage the one side of the tree to extend therefrom with the seat surface substantially horizontally disposed. A seat back arrangement having a supporting back surface is movably mounted to the platform brace arrangement for selective disposition in a first position with the back surface adjacent the seat surface outwardly from the tree and generally perpendicular to the seat surface and in a second position with the back surface spaced from and generally horizontal and parallel to the seat surface. Thus, in the first position, the seat surface may be used as a seat and the back surface may be used as a seat back for seating of the uer's main body facing toward the tree. In the second position, one of the seat surface and the back surface may be used as a seat for seating of the user's main body facing away from the tree.

In the preferred embodiment, the seat back arrangement is pivotably affixed to the platform brace arrangement for pivotal movement between the first and second positions. In the second position of the seat back arrangement, the back surface is disposed at a spacing above the seat surface and in engagement with the one side of the tree such that the back surface may be used as a seat, the one side of the tree may be used as a seat back and the seat surface may be used as a foot support. Bracing arms are provided on the seat back arrangement for engaging the platform brace arrangement in the first position to locate the back surface in its adjacent perpendicular relation to the seat surface.

The platform brace arrangement includes a tree-engaging brace element spaced from the seat surface and spaced side members extending between and affixed respectively to the brace element and the seat surface such that the seat surface, the brace element and the side members define an opening for extension therethrough of the user's legs when seated facing toward the tree in the first position. The platform brace arrangement also includes spaced seat frame arms adapted to extend along opposite lateral sides of the tree. The bracing frame arrangement includes spaced bracing frame arms adapted for telescopical engagement with the seat frame arms for encircling disposition of the main seat frame members and the seat bracing frame member about the tree.

DESCRIPTION OF THE PREFERRED EMBODIMENT

Figure 1:
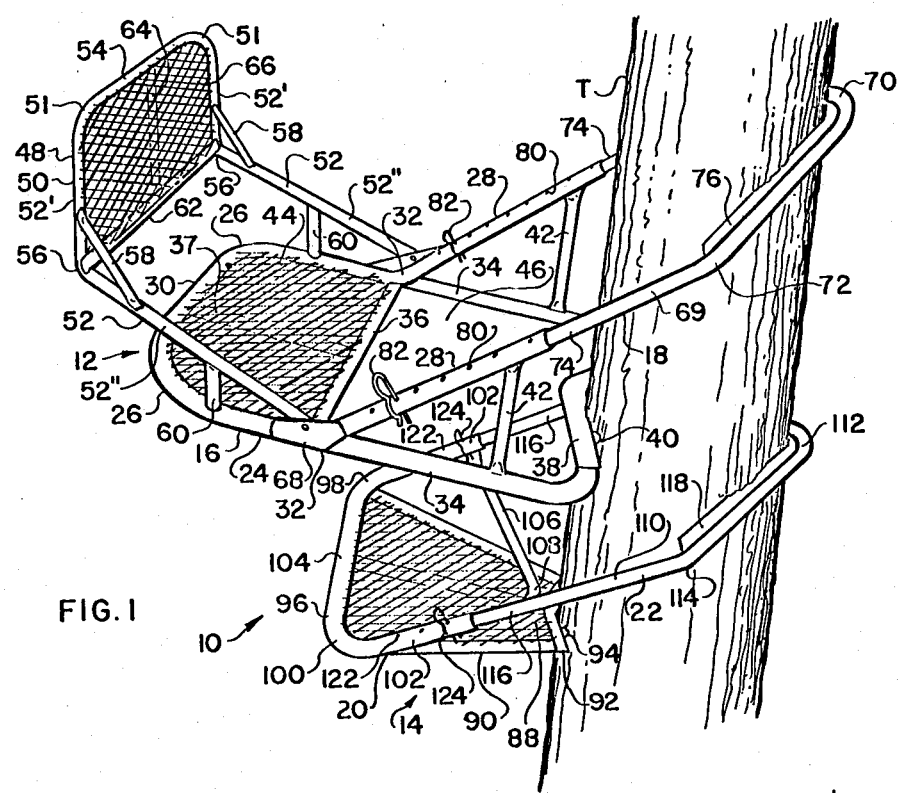
FIG. 1 is a perspective view of the tree climbing apparatus of the present invention.
Figure 3:
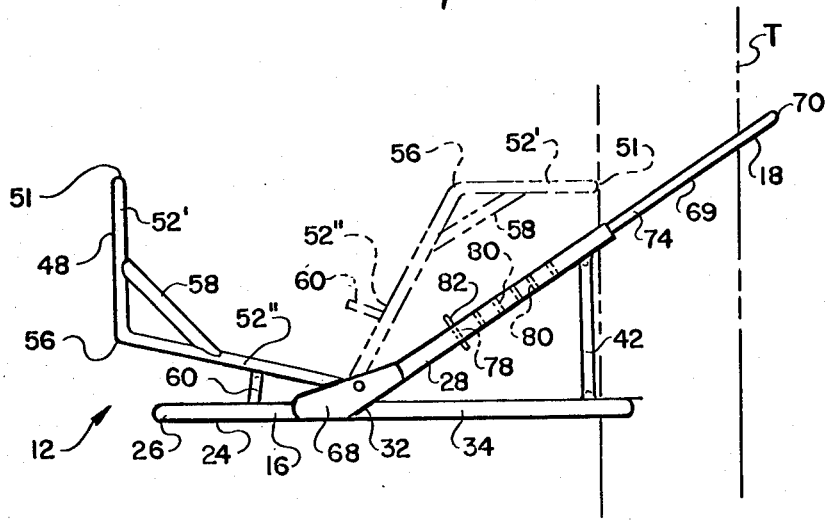
FIG. 3 is a side view thereof.
Figure 2:
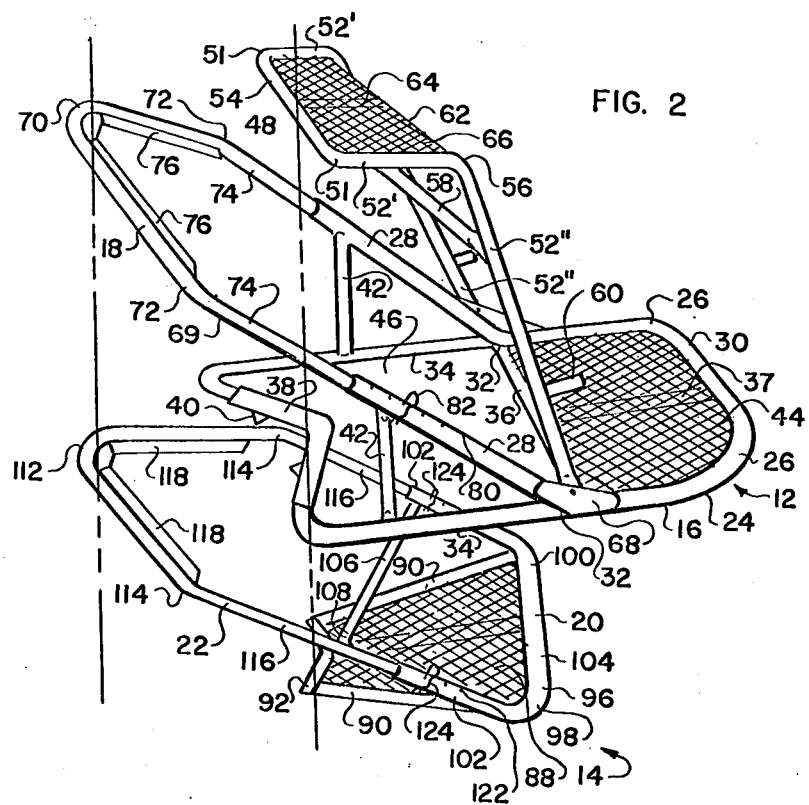
FIG. 2 is another perspective view thereof similar to FIG. 1 but showing the main body supporting seat frame assembly in a different condition.
Figure 4:
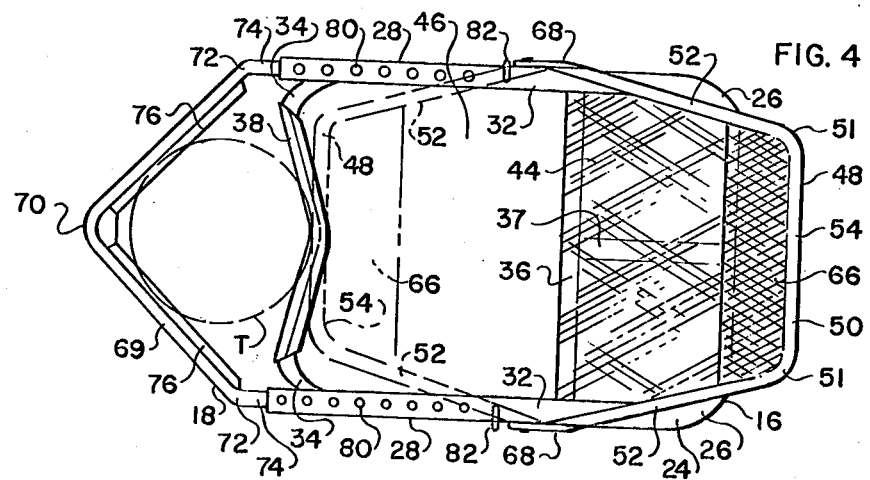
FIG. 4 is a top plan view thereof.

Referring now to the accompanying drawings, the tree climbing apparatus of the present invention is shown in FIG. 1 generally at 10 and basically includes a main body supporting seat frame assembly 12 and a foot supporting frame assembly 14. The main body supporting seat frame assembly 12 basically includes a main seat frame member 16 and a seat bracing frame member 18 adapted for selective affixation together in disposition about a tree T. The foot supporting frame assembly 14 similarly includes a main foot frame assembly 20 and a foot bracing frame member 22 adapted for selective affixation together in disposition about the tree T.

The seat frame member 16 is formed of round metal tubing and includes a main frame element 24 formed of one unitary length of tubing bent 90° at locations 26 into a U-shape having arms 28 and a central transverse connecting portion 30 therebetween, with each of the arms 28 being further bent at an approximately 30° upward incline at locations 32 spaced forwardly from the connecting portion 30. The opposite ends of a cross brace 36 are welded to the arms 28 at their bend locations 32 to extend transversely therebetween and another brace 37 is welded at it ends respectively to the cross brace 36 and to the connecting portion 30 to extend therebetween. A brace 34 is welded to each arm 28 at its bend location 32 to extend forwardly therefrom and a curved tree-engaging blade 38 is welded at its ends to the forward ends of the braces 34 to extend transversly therebetween. Relatively small teeth 40 are welded to the blade 38 to extend forwardly therefrom and are just large enough to penetrate only the bark of a tree. An upright support brace 42 is welded between each arm 28 and each brace 34. A flat section of heavy guage metal screen 44 is welded to the upward facing surfaces of the arms 28, the connecting portion 30, the cross brace 36 and the brace 37 to extend thereacross to provide a seat surface. An open area 46 is left between the side arms 28 and side braces 34, the seat 44 and the blade 38.

The seat frame member 16 includes a seat back member 48 having a frame element 50 formed of a length of metal tubing bent at locations 5 into a U-shape having arms 52 and a transverse connecting portion 54, with each of the arms 52 being further bent at locations 56 at somewhat less than a ninety degree (90°) incline forming arm portions 52',52" of arm 52. A brace 58 extends between and is welded at its ends to the respective angularly-related arm portions 52',52" of each arm 52 at spacings from its respective bend location 56. A supporting brace element 60 is welded to and extends from each arm portion 52" oppositely from the respective arm portion 52'. A cross brace 62 is welded at its opposite ends to the arms 52 at their bend locations 56 to extend transversely therebetween and another brace 64 is welded at its ends respectively to the cross brace 62 and to the connecting portion 54 to extend therebetween. A flat section of heavy guage metal screen 66 is welded to the arm portions 52', the connecting portion 54, the cross brace 62 and the brace 64 to extend thereacross to provide a back surface. A bracket plate 68 is welded to each arm 28 of the main frame element 24 at its bend location 32 to strengthen the arms 28 thereat and the outward ends of the arm portions 52" of the seat back member frame element 50 are pivotably affixed respectively to the bracket plates 68. As will be understood, the pivotal mounting of the seat back member 48 to the main seat frame member 16 permits the selective pivotal movement of the seat back member 48 between a rearward position wherein it rests by its supporting brace elements 60 on the arms 28 of the main seat frame member 16 (FIG. 1) and a forward position extending toward the seat bracing frame member 18 above the open area 46. In the rearward position, the back surface 66 is disposed adjacently above the seat surface 44 outwardly and rearwardly therefrom and generally perpendicularly thereto whereby the seat surface 44 may be used as a seat and the back surface 66 may be used as a seat back. In the forward position, the back surface 66 is disposed spaced above, forwardly of and parallel to the seat surface 44 for use of the back surface 66 as a seat and use of the seat surface as a foot support.

The seat bracing frame member 18 is formed of round metal tubing and includes a main frame element 69 formed of a unitary length of round metal tubing of smaller diameter than that used for seat frame member 16, the tubing being bent approximately 90° at a central location 70 and approximately 45° at each of two locations 72 on opposite sides thereof to provide a somewhat U-shape having arms 74. Each of the arms 74 has a tree engaging blade 76 welded thereto between the bend 70 and each bend 72. The arms 74 of the seat bracing frame member 18 are telescopically insertable into the arms 28 of the seat frame member 16. Each of the arms 74 has a hole 78 therethrough at its end and each of the arms 28 have a plurality of holes 80 therethrough spaced along their length. The holes 78 and 80 are brought into selective alignment by telescopic sliding movement of the arms 28,74 for adjusting them relative to each other and hitch pins 82 are provided to be inserted through aligned holes to hold the arms 28,74 in place.

The foot supporting assembly 14 includes the foot platform frame member 20 and the foot bracing frame member 22. The foot platform frame member 20 has a platform element 88 which is a piece of perforated sheet metal having metal sides 90 welded about its side edges and having a tree engaging blade 92 with teeth 94 welded to its forward side edge. A main foot frame element 96 is formed of a unitary length of round metal tubing bent 90° at locations 98,100 into a U-shape having arms 102 and a connecting portion 104 and is welded along its connecting portion 104 to the rearward side edge of the platform element 88 to extend at an upward incline therefrom approximately the same as the upward incline of arms 28 of seat frame member 16. A brace 106 bent 90° at its middle point 108 is welded at its point 108 to a central location on the platform 88 and at its ends to the arms 102. The brace 106 thus permits the user's feet to be placed beneath the brace 106 to be supported on the platform 88.

The foot bracing frame member 22 is formed of a unitary length of round metal tubing 110 of a smaller diameter than the tubing of the main foot frame member 96, bent 90° at its middle location 112 and 45° at the two locations 114 to provide a U-shape with arms 116 to be the same as the seat bracing frame member 18. Each of the arms 116 has a tree engaging blade 118 welded thereto between the bend 112 and the bends 114. The arms 116 of the foot bracing frame member 22 are telescopical in the arms 102 of the main foot frame member 96. The arms 116 have holes 120 at their ends and the arms 102 have a plurality of holes 122 spaced along their length for selective alignment with the holes 120 in telescopic engagement of the arms 102,116 to adjust them relative to each other and hitch pins 124 are provided to be inserted through aligned holes to hold the arms 102,116 in place.

The body supporting assembly 12 is placed on a tree or pole T by positioning the seat frame member 16 on a front side of the tree T with its arms 28 extending along opposite transverse sides of the tree and positioning the bracing frame member 18 on the rear side with its arms 74 extending along the transverse sides of the tree into telescoping engagement with the arms 28. By leverage, the blades 38 and 76 engage the tree on the opposite front and rear sides thereof when weight is placed on the seat frame member 16 to securely hold the body supporting assembly on the tree. The body supporting assembly may be disengaged from the tree by upward tilting of the seat frame member 16 to disengage the blades 38 and 76 from the tree and permitting the body supporting assembly to be slidably moved upwardly and downwardly along the tree. The foot supporting assembly 14 is placed on a tree T in the same manner as the body supporting assembly by positioning of the foot platform member 20 and the bracing frame member 22 on opposite sides of the tree and telescopically assembling them and the foot supporting assembly 14 is similarly engagable with the tree by leverage upon the application thereto of weight and disengagable for sliding movement by tilting of the foot platform member 20 upwardly. The user's feet are used to lift against the brace 32 to effect tilting of the foot platform member 21.

In use, the foot and body supporting assemblies 14,16 are placed on the tree T in the above-described manner with the foot support assembly 14 below the body supporting assembly 16, and with the body supporting assembly 16 initially disposed with its seat back member 48 in its rearward position. The user sits on the seat 44 with his or her legs through the opening 46 and the user places his or her feet on the platform element 88 beneath the brace 106. As will be understood, the user may thusly either be seated on the main body supporting assembly 12 or may stand on the foot supporting assembly 14. When sitting on the seat 44 of the body supporting assembly 12, the body supporting assembly 12 is held in engagement against the tree T under leverage forces exerted by the user's body weight and the user's feet can manipulate the foot supporting assembly 14 to tilt it upwardly and, as desired, slide it upwardly or downwardly along the tree. When standing on the platform element 88, the foot supporting assembly 14 is held in place against the tree T by leverage and the user may tilt the body supporting assembly upwardly and, as desired slide it upwardly or downwardly along the tree. By alternating these actions, the user can climb upwardly or downwardly along a tree trunk or any similar columnar member.

In ascending a tree T, the user will climb in the above-described manner to a desirable elevation and, once at such elevation, the user may selectively leave the seat back member 48 in its rearward position or re-position it in its forward portion. In the rearward position of the seat back member 48, the user is enabled to be comfortably seated facing toward the tree T utilizing the seat surface 44 as a seat for main body support and the back surface 66 as a seat back for back support and with the user's legs extending downwardly through the opening 46 and his feet supported on the platform 88 of the foot supporting assembly 14. As desired, the user may stand from the described seated position to support his entire body weight on the platform 88 and may turn thereon and within the open area 46 of the body supporting assembly 12 substantially three hundred sixty degrees (360°). Alternatively, in the forward position of the seat back member 48, the seat back member 46 abuts the front side of the tree T in horizontal disposition whereby the user is enabled to be comfortably seated facing away from the tree T utilizing the back surface 66 as a seat for main body support and utilizing the front side surface of the tree T as a seat back with the user's legs extending downwardly with his feet supported on the seat surface 44 as a foot support. As desired, the user may stand from the described seated position to support his entire body weight on the seat surface 44 and may turn thereon substantially three hundred sixty degrees (360°).

In this manner, the present tree climbing apparatus 10 uniquely provides distinct advantages over conventional tree climbing apparatus by facilitating usage of the main body supporting assembly 12 for user seating and standing facing either toward or away from the tree T and permitting the user full body turning in all cases. The present apparatus 10 therefore may be employed selectively to suit the individual preferences of substantially any user in substantially any situation and provides a very satisfactory degree of comfort and safety in all situations.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. An apparatus for climbing a tree or like columnar member comprising seat frame means for disposition about a tree for selective engagement therewith for supporting a user's main body and selective disengagement therefrom for sliding vertically therealong, said seat frame means including a main seat frame member for engaging the tree at one side thereof, a seat bracing frame member for engaging the tree at the opposite side thereof, and means for selectively affixing said main seat frame member and said seat bracing frame member in disposition about the tree, said main seat frame member including platform brace means having a supporting seat surface and adapted to engage the one side of the tree to extend therefrom with said seat surface substantially horizontally disposed, and seat back means having a supporting back surface and movably mounted to said platform brace means for selective disposition in a first position with said back surface adjacent said seat surface outwardly from said tree and generally perpendicular to said seat surface for use of said seat surface as a seat and use of said back surface as a seat back for seating of said user's main body facing toward the tree and in a second position with said back surface spaced from and generally horizontal and parallel to said seat surface for use of one of said seat surface and said back surface as a seat for seating of said user's main body facing away from said tree.

2. An apparatus according to claim 1 and characterized further in that said seat back means is pivotably affixed to said platform brace means for pivotal movement between said first and second positions.

3. An apparatus according to claim 1 and characterized further in that said back surface is disposed in said second position of said seat back means at a spacing above said seat surface and in engagement with the one side of the tree for use of said back surface as a seat, for use of the one side of the tree as a seat back and for use of said seat surface as a foot support.

4. An apparatus according to claim 1 and characterized further in that said seat back means includes bracing arm means for engaging said platform brace means in said first position for locating said back surface in said adjacent generally perpendicular relation to said seat surface.

5. An apparatus according to claim 1 and characterized further in that said platform brace means includes a tree-engaging brace element spaced from said seat surface and spaced side members extending between and affixed respectively to said brace element and said seat surface, said seat surface, said brace element and said side members defining an opening for extension therethrough of the user's legs when seated facing toward the tree in said first position of said seat back means.

6. An apparatus according to claim 1 and characterized further in that each of said seat surface and said back surface is substantially flat.

7. An apparatus for climbing a tree or like columnar member comprising seat frame means for disposition about a tree for selective engagement therewith for supporting a user's main body and selective disengagement therefrom for sliding vertically therealong, said seat frame means including a main seat frame member for engaging the tree at a front side thereof, a seat bracing frame member for engaging the tree at the opposite rear side thereof, and means for selectively affixing said main seat frame member and said seat bracing frame member in disposition about the tree, said main seat frame member including platform brace means having a generally flat supporting seat surface, a tree engaging brace element spaced from said seat surface and spaced side members extending between and affixed rspectively to said brace element and said seat surface, said seat surface, said brace element and said side members defining an opening therebetween, said platform brace means being adapted to engage the front side of the tree with said brace element and to extend therefrom with said seat surface substantially horizontally disposed, spaced seat frame arms affixed to and extending from said platform brace means to extend on opposite sides of the tree laterally adjacent the front side thereof, and seat back means having a generally flat supporting back surface and spaced side arms extending therefrom and pivotably affixed to said platform brace means for selective pivotal movement of said seat back means between a first position with said back surface adjacently above said seat surface outwardly from said tree and generally perpendicular to said seat surface for use of said seat surface as a seat and use of said back surface as a seat back for seating of the user's main body facing toward the tree with the user's legs extending downwardly through said opening of said platform brace means, and a second position with said back surface spaced above and generally horizontal and parallel to said seat surface and in engagement with the front side of the tree for use of said back surface as a seat, for use of the front surface of the tree as a seat back and for use of said seat surface as a foot support for seating of the user's main body facing away from the tree with the user's legs extending downwardly and supported on said seat surface.

8. An apparatus according to claim 7 and characterized further in that said seat bracing frame member includes spaced seat bracing frame arms adapted for telescopical engagement with said seat frame arms for encircling disposition of said main seat frame member and said seat bracing frame member about the tree.

9. An apparatus according to claim 7 and characterized further in that said seat back means includes bracing arm means for engaging said platform brace means in said first position for locating said back surface in said adjacent generally perpendicular relation to said seat surface.

* * * * *